May 20, 1924.
J. W. RESH ET AL
1,495,108
AIRCRAFT STABILIZER
Filed Dec. 11, 1922
3 Sheets-Sheet 1
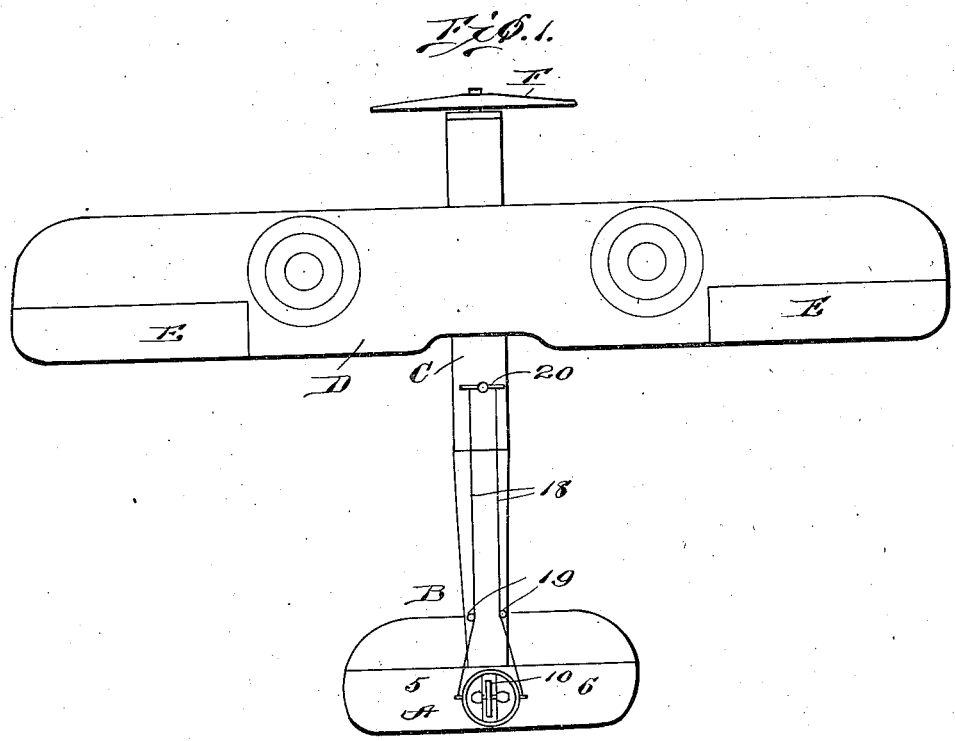
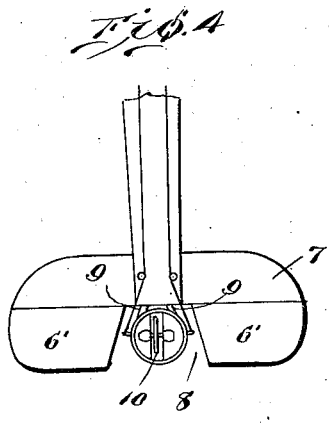

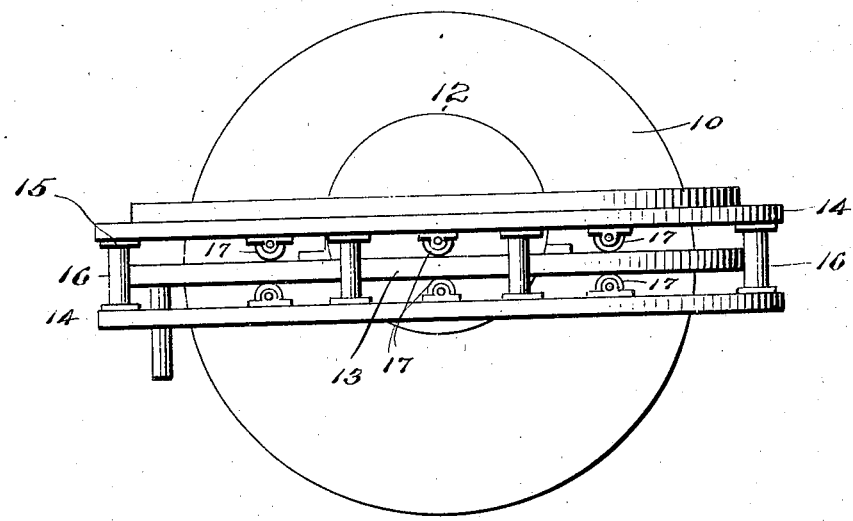

May 20, 1924.

J. W. RESH ET AL 1,495,108

AIRCRAFT STABILIZER

Filed Dec. 11, 1922      3 Sheets-Sheet 3

Inventors
Jacob William Resh
Charles Kinzer

By Shreve, Crowe & Gordon
Attorneys

Patented May 20, 1924.

1,495,108

UNITED STATES PATENT OFFICE.

JACOB WILLIAM RESH AND CHARLES KUNZE, OF KENNETT, CALIFORNIA, ASSIGNORS OF THREE-EIGHTHS TO VICTOR E. WARRENS, OF HILT, CALIFORNIA.

AIRCRAFT STABILIZER.

Application filed December 11, 1922. Serial No. 606,187.

*To all whom it may concern:*

Be it known that we, JACOB WILLIAM RESH and CHARLES KUNZE, citizens of the United States, residing at Kennett, in the county of Shasta and State of California, have invented new and useful Improvements in Aircraft Stabilizers, of which the following is a specification.

This invention relates to the stabilization of aircraft and particularly aeroplanes. The main object of the invention is to provide effective safety means which will operate automatically to maintain the stability of an aircraft, marine vessel or vehicle of any description while in motion, the stabilizing means, when used on an aeroplane, causing the same to pursue a straightaway course and preventing the same from going into a tail spin or steep spiral descent, enabling a safe landing to be made in case of stoppage of the motive power of the craft.

With the above and other objects in view, the invention consists in the novel construction, combination and arrangement herein fully described, shown, and claimed.

In the accompanying drawings:

Figure 1 is a top plan view of an airplane showing the stabilizing means thereon;

Figure 2 is an enlarged side elevation of the stabilizing means;

Figure 4 is a fragmentary top plan view showing another mounting for the stabilizer.

Figure 3:
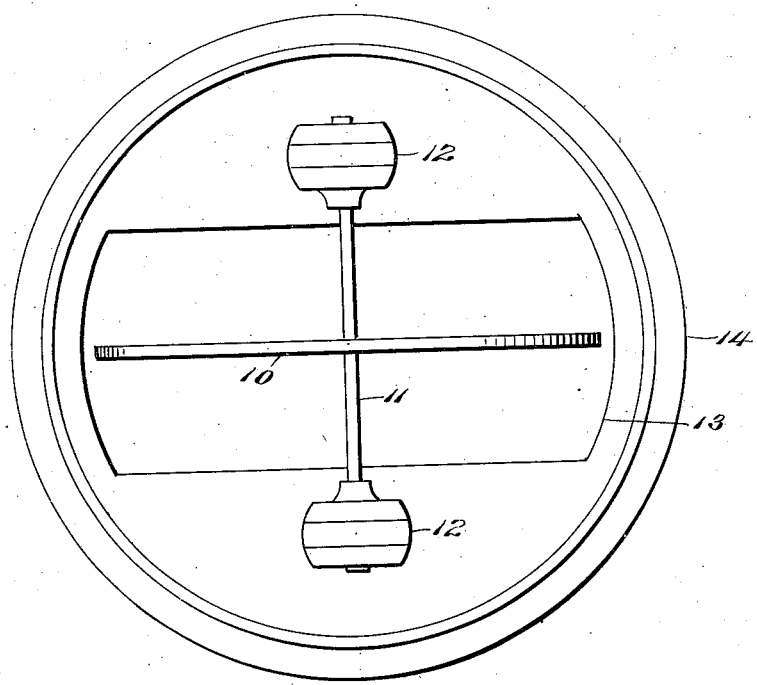
Figure 3 is a plan view of the same.

In order to illustrate the principle of the invention, the stabilizing means shown generally at A is mounted on a part of the empennage B of an airplane embodying a fuselage or body C wings D, lateral balancing surfaces or ailerons E and propeller F.

As shown in Figure 1, the stabilizer A which comprises a gyroscope is mounted in a circular opening 5 in the elevator 6 of the airplane in rear of the fixed stabilizing surface or horizontal fin 7, the elevator 6 being, as usual, hinged to the rear of the surface 7.

In Figure 4, the elevator 6' is centrally cut away leaving a gap 8 in which the stabilizer A is mounted, said stabilizer being supported by outriggers 9 projecting rearwardly from the fuselage C. Other ways of mounting the stabilizer A may be devised.

The stabilizing means A, as shown in the enlarged detail views, Figures 2 and 3, comprises a high speed rotor or wheel 10, on a driving shaft 11 to which motion is imparted by one or more motors 12 supported on a turntable 13 which sets in the opening 5 in the elevator 6, as shown in Figure 1, the shaft 11 being normally horizontal when the machine is in flight, and the rotor operating in a normally vertical plane and serving as the vertical rudder of the craft whether the rotor is operating or still.

The turntable 13 is mounted in a supporting frame shown as comprising upper stationary rings 14 connected in spaced relation to each other by pins or bolts 15 encircled by rollers 16 against which the periphery of the turntable rides. Other rollers 17 bear against the top and bottom surfaces of the turntable 13, and together with the rollers 16 enable the turntable to be revolved freely without material friction.

The diameter and surface of the rotor will be proportionate to the size and general design of the aircraft so that the rotor will serve as the vertical rudder as well as a stabilizer to maintain the aircraft on a straightaway course and prevent the same from getting into a tailspin. The frame 14 is fixedly mounted in the opening 5 of Figure 1 in the elevator, or fastened to the outriggers 9 of Figure 4.

Operating means such as cables 18 are secured to the turntable 13 at about diametrically opposite points thereof and extend forwardly over suitable guide pulleys 19 to a vertical rudder control, such as a foot bar 20. Thus the rotor 10 acts as a vertical rudder whether it is rotating or not. When rotating the rotor 10 keeps the machine from turning suddenly to the right or left and causes the machine to fly on a straight course.

The stabilizer may be used with equally good results on all types of aircraft, marine vessels, and land vehicles of all kinds, and such stabilizer may be placed at any desired place on the vehicle to give the best results without departing from the spirit of the invention herein described. The rotor 10 is preferably in the form of a disc so as to offer as little head resistance as possible, while its supporting frame may be housed within the plane of the elevator for the same purpose. A hand switch may be used to control the operation of the gyroscopic stabilizer, so that it may be readily thrown into or out of operation.

The motors 12 may be energized from a storage battery or any other source of electric energy.

In practice, we have found that the form of our invention illustrated in the accompanying drawings and referred to in the above description, as the preferred embodiment, is the most efficient and practical; yet realizing the conditions concurrent with the adoption of our device will necessarily vary, we desire to emphasize that various minor changes in details of construction, proportion and arrangement of parts, may be resorted to within the scope of the appended claims without departing from or sacrificing any of the principles of this invention.

Having thus described our invention, and without enumerating variations and equivalents, what we desire protected by Letters Patent is as set forth in the following claims:

1. In combination with an aircraft, a gyroscopic stabilizer mounted in such relation to the aircraft as to maintain the directional stability thereof, said stabilizer embodying a vertically positioned disc-like rotor, and means to actuate the rotor about its vertical axis at an angle with respect to the direction of flight to provide a combined stabilizer and vertical rudder.

2. In combination with an aircraft a gyroscopic stabilizer mounted in such relation to the aircraft as to maintain the directional stability thereof, said stabilizer embodying a vertically positioned disc-like rotor, means to effect continuous rotation of the disc, and additional means to actuate the rotor about its vertical axis at an angle with respect to the direction of flight to provide a combined stabilizer and vertical rudder.

3. In combination with an aircraft, a high speed rotor of disc-like formation mounted adjacent the rear end of the fuselage, means to effect continuous rotation of the disc, and additional means to actuate the rotor about its vertical axis to provide a combined stabilizer and vertical rudder.

4. In combination with an aircraft, a gyroscopic stabilizer mounted in such relation to the aircraft as to maintain the directional stability thereof, said stabilizer embodying a vertically positioned disc-like rotor, means under control of the pilot for continuous rotation of the rotor around a horizontal axis, and additional means also under control of the pilot to actuate the rotor about its vertical axis at an angle with respect to the direction of flight to provide a combined stabilizer and vertical rudder.

JACOB WILLIAM RESH.
CHARLES KUNZE.

Witnesses:
K. V. BLAIR,
W. W. MIDDLETON.